(Model.)
J. J. FRAIKIN.
CHECK ROW CORN PLANTER.
No. 270,049. Patented Jan. 2, 1883.
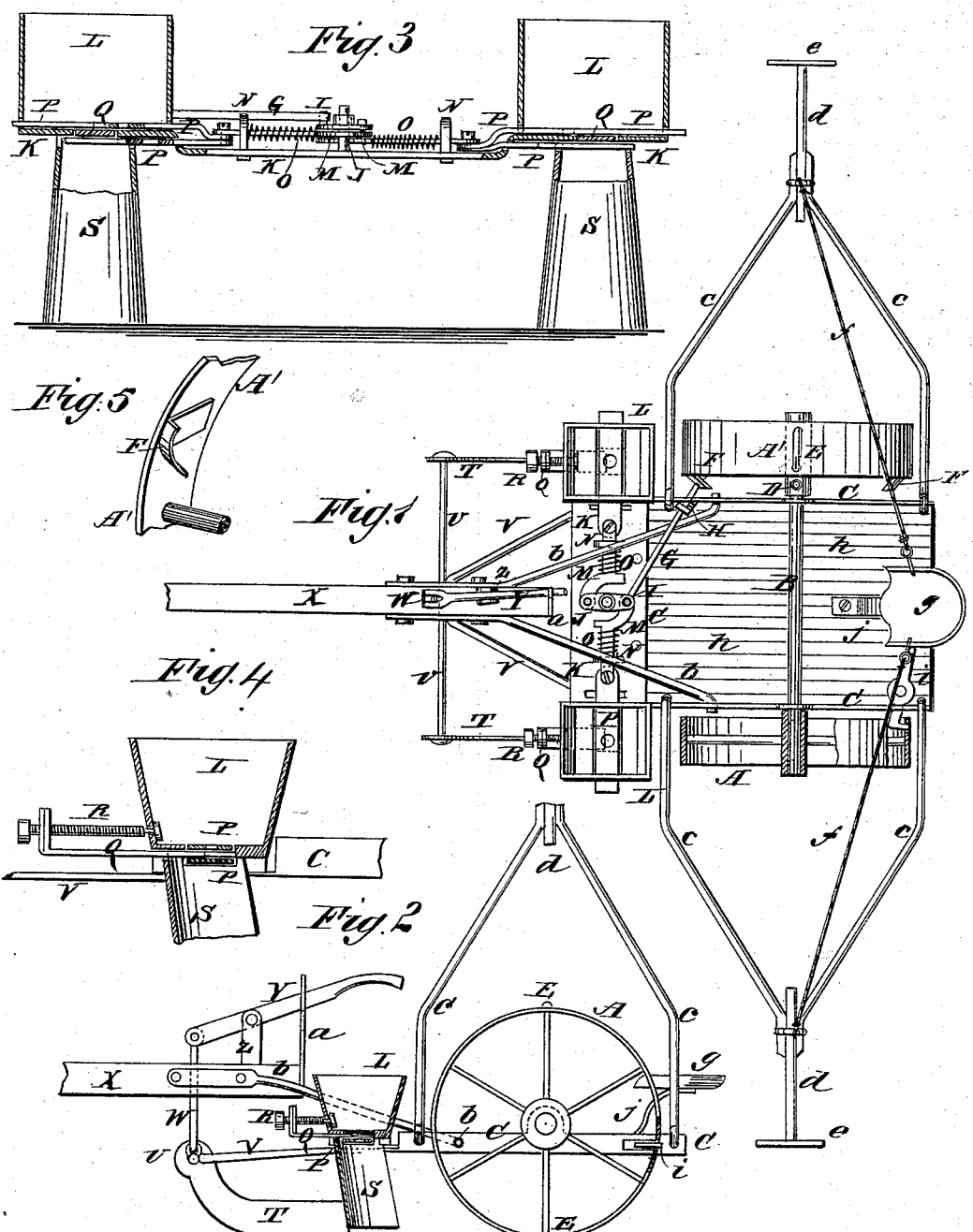
WITNESSES:
Francis McArdle
B. G. Underwood.
INVENTOR:
J. J. Fraikin,
BY Munn & Co
ATTORNEYS.

UNITED STATES PATENT OFFICE.

JOHN J. FRAIKIN, OF OTTAWA, ILLINOIS.

CHECK-ROW CORN-PLANTER.

SPECIFICATION forming part of Letters Patent No. 270,049, dated January 2, 1883.

Application filed June 30, 1882. (Model.)

*To all whom it may concern:*

Be it known that I, JOHN J. FRAIKIN, of Ottawa, in the county of La Salle and State of Illinois, have invented a new and useful Improvement in Check-Row Corn-Planters, of which the following is a full, clear, and exact description.

Reference is to be had to the accompanying drawings, forming a part of this specification, in which similar letters of reference indicate corresponding parts in all the figures.

Figure 1 is a plan view of my improvement, part being broken away. Fig. 2 is a side elevation of the same, partly in section. Fig. 3 is a sectional front elevation of the seed-dropping mechanism. Fig. 4 is a sectional side elevation of one of the seed-boxes. Fig. 5 is a perspective view of the inner side of a part of the driving-wheel rim.

The object of this invention is to facilitate the planting of corn in accurate check-rows.

The invention consists in the peculiar construction and arrangement of parts, as hereinafter fully described, and pointed out in the claims.

A A' are the wheels, the axle B of which revolves in bearings attached to the frame C. The wheel A is rigidly attached to the axle B. The other wheel, A', revolves upon the axle B, and is made to carry the said axle B with it in its revolution by a pin, D, which passes through a hole in the inner end of the hub of the said wheel and through a hole in the said axle, so that the wheels can be allowed to revolve independently of each other, for convenience in turning around, by withdrawing the pin D, and can be made to revolve together by inserting the said pin.

Upon the rims of the wheels A A' are formed cross-ribs E in such positions as to mark the ground opposite the cross-rows of hills.

To the inner part of the inner side of the wheel A' are attached cams F, which, as the said wheel revolves, successively strike the outer end of a rod, G, and push the said rod inward. The outer part of the rod G passes through a guide-hole in a short stud, H, attached to the frame C, and its inner end has an eye formed through it to receive a pin, I, attached to the rear end of the short lever J, pivoted at its center to the board K, that carries the seed-boxes L.

To the ends of the equal-armed lever J are pivoted the curved inner ends of the connecting-rods M, which pass through guide-holes in short standards or lugs N, attached to the board K, and are provided with spiral springs O, placed upon them and interposed between their bent inner ends and the lugs N, to push the rods M inward, and bring the lever J and push-rod G back to their former positions, when the said rod is released from each cam F.

To the outer ends of the connecting-rods M are pivoted the inner ends of the seed-dropping slides P, each of which is made double, and has one of its parts above and the other below the bottom of the seed-boxes L. The parts of the slide have holes formed through them for the passage of the seed, which holes are not opposite each other, so that the seed that passes through the upper hole will rest upon the lower part of the slide within a cavity of the seed-box bottom until the movement of the slide brings the hole in the lower part of the said slide beneath the said cavity in the seed-box bottom and allows the seed to drop to the ground. The size of the seed-receiving openings in the bottoms of the seed-boxes is regulated by gage-plates Q, which slide in grooves in the bottoms of the seed-boxes L and enter the space between the parts of the seed-dropping slides P. The outer ends of the gage-plates Q are bent upward at right angles, and have screw-holes formed through them to receive the screws R, the inner ends of which are swiveled to the forward sides of the seed-boxes L, so that the said gage-plates can be adjusted by turning the said screws.

The board K, that carries the seed-boxes L, is attached to the frame C and to the upper ends of the standards S, which are made hollow, and are open upon their rear sides.

To the forward sides of the lower ends of the standards S are attached the rear ends of the runners T, that open channels in the soil to receive the seed. The forward ends of the runners T are connected by a round, U, to the middle part of which are attached the forward ends of the braces V, the rear ends of which are attached to the board K or to the forward corners of the frame C.

To the center of the round U is attached the lower end of the connecting-rod W, which passes up through a slot in the tongue X, and is hinged at its upper end to the forward end of the lever Y. The lever Y is fulcrumed to a standard, Z, attached to the tongue X, and its rear part moves along the side edge of the catch-bar a, which is attached at its lower end to the tongue X, and has notches in its edge to receive the lever Y and hold it securely in any position into which it may be adjusted.

To the opposite sides of the rear part of the tongue X are rigidly attached the forward ends of the braces b, which incline outward, and are hinged at their rear ends to the forward corners of the frame C. With this construction, by operating the lever Y the runners T can be adjusted to work at any desired depth in the ground, and can be raised from the ground for convenience in turning around, the axle B serving as the fulcrum for this adjustment.

To the forward and rear ends of each side bar of the frame C are hinged the inner ends of two rods, c, which project outward to pass the drive-wheel, and are then bent inward, and are attached to the opposite sides of a rod, d, at a little distance from its inner end.

To the outer end of the rod d is attached the marking plate or shoe e. The rods c d are made of such a length that the plate or shoe e will mark the soil at such a distance from the machine that the said mark will be directly beneath the tongue X at the next passage of the machine across the field, and will serve as a guide to the driver in directing the machine. The said rods c d are also made of such a length that the inner end of the rod d will be directly over the mark made by the wheel of the machine in its last passage.

To the rods c d, at their point of meeting, are attached the outer ends of cords f, the inner ends of which are connected to the driver's seat g or to some other part of the machine by hooks or other suitable means, so that the driver by operating the cords f can raise and lower the markers, as may be desired.

To the rear corner of the frame C, or to the rear corner of the platform h, attached to the said frame, is pivoted a short lever, i, the outer end of which is bent to the rearward to enter a hole in the rim of the drive-wheel A, when the said wheel is in such a position that one of the marking-ribs E will be upward and the other downward, so as to lock the wheels from turning. The inner end of the lever i is bent upward, so that the said lever can be conveniently operated. The driver's seat g is attached to the upper end of the standard j, the lower end of which is attached to the platform h.

In using the machine the marker next the planted rows is kept raised. At the ends of the rows the other marker is raised, the pin D is withdrawn, and the push-rod G is disconnected. The machine is then turned, and as the cross-ribs of the wheels come into a vertical position the pin D is inserted and the lever i is operated to lock the wheels from turning, and when the inner end of the rod d of the marker is over the mark made by the cross-rib E of the drive-wheel at the last crossing the push-rod G is again connected, the lever i is operated to release the wheels A A', and the machine is driven forward, planting the hills in accurate check-row.

Having thus described my invention, I claim as new and desire to secure by Letters Patent—

1. In a seed-planter, the combination, with the frame C and the tongue X, hinged thereto, of the board K, the hollow standards S, the runners T, having their rear ends secured to the said standards, the round U, connecting-rod W, lever Y, and catch-bar a, substantially as and for the purpose set forth.

2. In a seed-planter, the drive-wheel A', provided with the cams F on the inner surface of the rim, the board K, provided with the lugs N, and the seed-slides P, of the push-rod G, the equal-armed lever J, the rods M, having bent inner ends, and the springs O, substantially as and for the purpose set forth.

3. In a seed-planter, the combination, with the frame C, of the converging rods c, hinged to the frame, the rod d, provided with the shoe e and secured between the ends of the said rods c, and the cords f, attached to the outer ends of the rods c and to the driver's seat g, substantially as and for the purpose set forth.

JOHN J. FRAIKIN.

Witnesses:
D. LORRIAUX,
ALFRED MOTTAZ.